May 2, 1961     R. M. SEELEY, JR     2,982,887
COMBINED AMPLITUDE COMPARATOR AND INDICATOR
Filed Feb. 19, 1958

RALPH M. SEELEY, Jr.
*INVENTOR.*

BY
*V.C. Muller*
ATTORNEYS

_United States Patent Office_

2,982,887
Patented May 2, 1961

2,982,887

COMBINED AMPLITUDE COMPARATOR AND INDICATOR

Ralph M. Seeley, Jr., Port Matilda, Pa., assignor, by mesne assignments, to the United States of America as represented by the Secretary of the Navy Filed Feb. 19, 1958, Ser. No. 716,250

9 Claims. (Cl. 317—149)

This invention relates broadly to voltage level indicators, and more specifically to a voltage level indicator by means of which a voltage may be compared with a reference voltage of predetermined value and the comparison thereof indicated. While not specifically limited thereto, the voltage level indicator of the present invention is particularly useful for comparing and indicating when the level of one voltage is equal to the level of another voltage and comparing a voltage of unknown level to a voltage of known level to obtain a desirable result, such as for example closing a relay to actuate an electric circuit at the time the level of the two voltages becomes equal as in target detection systems and the like.

One method of comparing a signal voltage with a fixed reference voltage in a system is to connect a meter between the two points in the system representative of the signal voltage and the reference voltage respectively. Another method for comparing one voltage with another includes a bridge circuit or a circuit in which a voltage indicator is switched repeatedly from one source of voltage to the other. In other applications it is quite often desirable that the level of a signal containing noise be measured in an accurate and trustworthy manner. In such an application the desired operation is an indication of equality to a preset level and translation of the indication into a useful result such as for example actuating or deactuating another electric circuit. The class of electronic devices known as "amplitude comparators" satisfy the indication requirement but translation of the indication to a useful result generally requires separate and independent means. Under normal operating conditions, prior art devices incorporating a vacuum tube generally draw grid current thus limiting the type or types of vacuum tubes that can be used satisfactorily. Pentodes that draw relatively heavy plate currents are generally recommended for such applications thus requiring a large power source and the fact that such tubes draw grid current seriously effects their reliability. Still further, they are not generally adaptable for the inclusion of an output indicator.

According to the present invention apparatus utilizing a vacuum tube is provided for comparing voltages from two sources with a high degree of accuracy, that will provide substantially instantaneous indication of comparison, and that automatically removes the comparator from the circuit after actuation thereby preventing unnecessary consumption of power by the comparator.

In accordance with the present invention there is provided a voltage comparison circuit which may include a diode and an electronic device such as for example a vacuum tube wherein the diode indicates voltage equality by conduction. The conduction of the diode is sensed by a vacuum tube and voltage transforming means wherein the vacuum tube perceives the conduction through the diode as a lowering of positive feedback-loop attenuation sufficient to cause maximum and substantially instantaneous conduction through the vacuum tube. Conduction of the vacuum tube, through suitable means, thereafter translates the voltage comparison to an indication thereof and simultaneously removes the vacuum tube or comparator from the circuit.

The invention described herein has an accuracy of about ±0.15 db as compared to an accuracy of ±1 to 2 db for prior art devices and requires minimum power both before and after actuation due to the fact that the vacuum tube or comparator is virtually cut off prior to actuation and is completely removed from the circuit immediately thereafter. Tube selection is not restricted and the invention provides a highly reliable device in that the "latching margin" or the ability of the comparator to latch the relay of the comparator remains substantially constant even though the vacuum tube may be near the end of its life. One embodiment of the invention operates with low quiescent plate current before amplitude comparison and is most useful in high frequency applications because of its high input impedance. Another embodiment, although having a higher quiescent plate current and lower input impedance, has application where high accuracy must be obtained even though circuit component variations may be large.

It is accordingly a principal object of the present invention to provide an improved amplitude comparator and indicator.

It is another object of the present invention to provide an amplitude comparator and indicator wherein the comparator is automatically removed from the circuit after actuation.

It is another object of the present invention to provide an amplitude comparator and indicator having a high input impedance and that draws minimum current during normal operation.

A further object of the present invention is the provision of an amplitude comparator and indicator having a high degree of accuracy.

A still further object of the present invention is the provision of a versatile amplitude comparator and indicator having a minimum number of components, thereby substantially reducing manufacture and maintenance cost and realizing a high degree of reliability not heretofore obtainable.

These and other objects which are features of the invention, together with their incident advantages, will be more readily understood and appreciated from the following detailed description of preferred embodiments thereof selected for purposes of illustration and shown in the accompanying drawing, in which.

Figure 1:
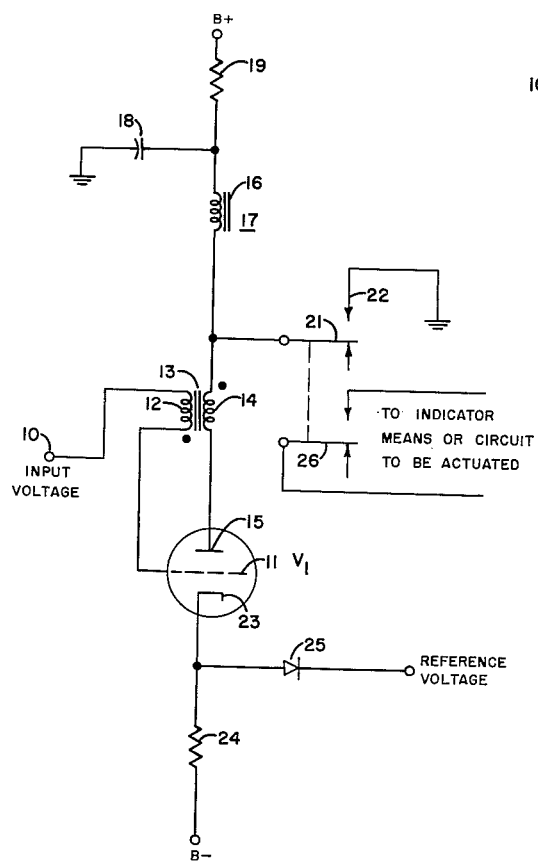
Figure 1 is a schematic of an embodiment of the invention for comparing an unknown voltage with a reference voltage and providing a high input impedance.

In the apparatus shown in Figure 1 the unknown varying input voltage is applied at point 10 and is applied to the grid 11 of vacuum tube $V_1$ through the input winding 12 of a transformer 13 wound for positive feedback to the input winding. One terminal of the output winding 14 of the transformer 13 is connected to the plate 15 of vacuum tube $V_1$ and the remaining terminal is connected to the coil 16 of the relay 17. One terminal of the coil 16 of the relay 17 is connected to the output winding 14 of the transformer 13 and the remaining terminal is connected to ground through a condenser 18 and to a B+ supply through a limiting resistor 19. The relay 17 may be of the type having a plurality of contacts wherein actuation of the relay connects the B+ supply to ground through the coil 16 of the relay upon substantial conduction of the vacuum tube $V_1$ and opens and/or closes an electrical circuit or produces an indication as may be desired when the amplitude of the unknown voltage substantially reaches the magnitude of the reference voltage as mentioned hereinbefore. Arm 21 of the relay 17 is connected between the coil 16 and the output transformer winding 14 and provides a path to ground through contact 22 upon actuation of the relay as described hereinafter. The cathode 23 of vacuum tube $V_1$ is connected to a B— supply approximately equal to and opposite that of the B+ supply through a resistor 24 having a high resistance and is also connected to the reference voltage through a diode 25. It is necessary for proper circuit operation that the diode 25 in the cathode circuit have a very large value of back resistance and a small forward resistance. A 1N70 diode of the "Zener" type may be used having a back resistance of 200–300 megohms below the Zener voltage, at room temperature, and a low forward resistance of a value, for example, less than that of a vacuum tube diode. A small value of forward resistance is desirable to aid in maintaining a long pulse; however, the inductance and grid input resistance will quickly become controlling, so that it is not necessary to use a "high-conductance" diode. The vacuum tube used should preferably be a low-power tube having a high $gm$ and a low dynamic grid impedance in the positive-grid regions.

Due to the existence of reasonably large B+ and B— supplies, vacuum tube $V_1$ acts as a cathode follower, hence the potential on the cathode 23 will increase in direct proportion to an increase in the potential of the grid 11 as is common with cathode follower circuits well known in the art. During quiescent operation the input impedance at the grid 11 of vacuum tube $V_1$ is extremely high because there is substantially no grid current flowing and during this time vacuum tube $V_1$ will draw for example about 1 milliampere of current. When the magnitude of the input voltage reaches the magnitude of the reference voltage the potential on the cathode 23, minus the necessary diode "forward" voltage, will be substantially equal to the reference voltage for the reason stated immediately hereinabove and the diode 25 can and will conduct. Conduction of the diode 25 effectively removes the negative feedback present previously because the circuit had been acting as a cathode follower and vacuum tube $V_1$, due to the positive feedback of transformer 13, will almost immediately, such as for example within 25 milliseconds or less, reach its maximum plate current. The condenser 18 provides a low impedance path to ground for the rapidly increasing plate current, which current is sufficient to cause operation of the relay 17. Actuation of the relay 17 and hence arm 21 places the plate 15 of vacuum tube $V_1$ at ground potential thus inactivating the vacuum tube and simultaneously allowing the B+ supply to maintain the relay 17 in its now closed position. Indication of the comparison and actuation of other circuitry as may be desired is simultaneously initiated through the operation of arm 26. The amplitude comparator may be returned to its quiescent state by manually interrupting the B+ supply circuit through the coil 16 or by automatically interrupting the B+ supply through the coil 16 by means well known to those experienced in the art, such as for example by a time delay circuit.

Figure 2:
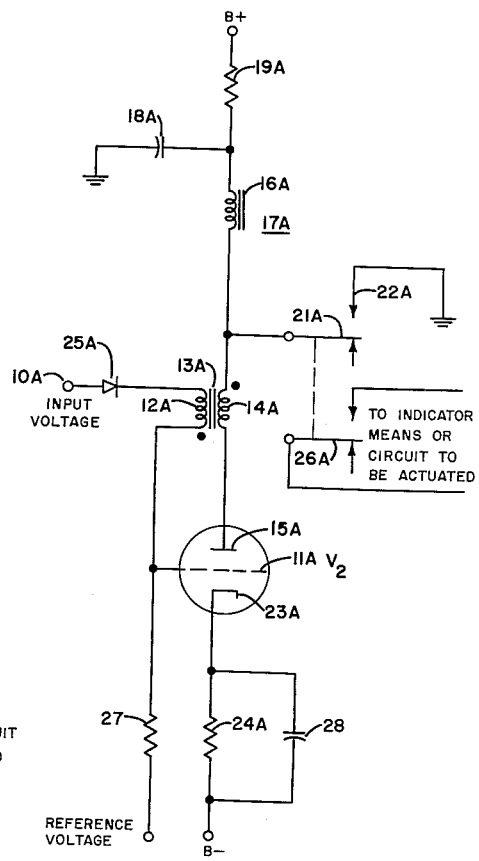
Figure 2 is a schematic of another embodiment of the invention similar to that shown in Figure 1 for providing a high degree of accuracy and having a lower input impedance.

Figure 2 shows a substantially similar modification of the embodiment shown in Figure 1 wherein the numerals having the suffix "A" indicate components identical with components shown in Figure 1 designated by the same numeral. With specific reference now to Figure 2 the plate circuit of vacuum tube $V_2$ is identical with the plate circuit of vacuum tube $V_1$. The unknown varying input voltage is applied to the grid 11A of vacuum tube $V_2$ through a diode 25A and the input winding 12A of a transformer 13A wound for positive feedback to the input winding 12A and having its output winding 14A connected in the plate circuit of vacuum tube $V_2$. The reference voltage is also applied to the grid 11A of vacuum tube $V_2$ through a resistor 27. The cathode 23A of vacuum tube $V_2$ is connected to B— through a larger resistor 24A and a capacitor 28 connected in parallel.

For the embodiment shown in Figure 2 the input impedance to the grid 11A of vacuum tube $V_2$ will be less than that for the embodiment shown in Figure 1 due to the connection of the reference voltage directly to the grid 11A. However, substantial conduction of vacuum tube $V_2$ does not occur until the magnitude of the input voltage equals the magnitude of the reference voltage because it is necessary that diode 25A conduct before vacuum tube $V_2$ can begin substantial conduction. Due to the grid-cathode connections the potential on the grid 11A and cathode 23A of vacuum tube $V_2$ will be approximately equal, such as for example within about 1 volt, and for this reason the plate current through vacuum tube $V_2$ will be very small during quiescent operations although somewhat greater than the plate current for the circuitry shown in Figure 1. It may now be obvious that selection of a vacuum tube that will, during quiescent operation, operate in its linear region insures that grid cut-off effects do not effect the comparison of the input voltage with reference voltage and that the vacuum tube will draw but a very small amount of current during quiescent operation.

When the magnitude of the input voltage equals the magnitude of the reference voltage diode 25A will conduct thereby causing the plate current of vacuum tube $V_2$ to begin increasing. The positive feedback of transformer 13A, as pointed out hereinbefore, causes vacuum tube $V_2$ to immediately reach its maximum plate current and operation thereafter is identical to the operation of the circuitry shown in Figure 1 and described hereinabove.

While the present invention has been described in its preferred embodiment, it is realized that modifications may be made, and it is desired that it be understood that no limitations on the invention are intended other than may be imposed by the scope of the appended claims.

Having now disclosed my invention, what I claim as new and desire to secure by Letters Patent of the United States is:

1. A signal level indicator circuit comprising: an electronic device having at least an anode, a cathode, and a control electrode said cathode being connected to a source of negative voltage; voltage transforming means having a first portion connected to said anode and a second portion connected to said control electrode to provide positive feedback from said anode to said control electrode; a voltage comparison circuit operationally connected to said electronic device for comparing a varying voltage and a reference voltage and maintaining said electronic device in a linear conducting region when said varying voltage is less than said reference voltage and causing said electronic device to attain maximum conduction when said voltages are substantially equal; a relay operatively connected in series between said transforming means first portion and a source of positive plate voltage, said relay having a contact connected intermediate said relay and said anode and connectable to ground upon actuation of said relay; and a condenser connected between said relay and ground.

2. A signal level indicator circuit comprising: an electronic device having at least an anode, a cathode, and a control electrode said cathode being connected to a source of negative voltage; voltage transforming means having a first portion connected to said anode and a second portion connected to said control electrode to provide positive feedback from said anode to said control electrode; a voltage comparison circuit including said transforming means second portion and operationally connected to said electronic device for comparing a varying voltage and a reference voltage and maintaining said electronic device in a conducting state when said varying voltage is less than said reference voltage and causing said electronic device to attain maximum conduction when said voltages are substantially equal; a relay operatively connected in series between said transforming means first portion and a source of positive plate voltage, said relay having a contact connected intermediate said relay and said anode and connectable to ground upon actuation of said relay; and a condenser connected between said relay and ground.

3. A signal level indicator circuit comprising: an electronic device having at least an anode, a cathode, and a control electrode said cathode being connected to a source of negative voltage; voltage transforming means having a first portion connected to said anode and a second portion connected to said control electrode to provide positive feedback from said anode to said control electrode; a voltage comparison circuit connected to said transforming means second portion and operationally connected to said electronic device control electrode and cathode for comparing a varying voltage and a reference voltage and maintaining said electronic device in its linear conducting region when said varying voltage is less than said reference voltage and causing said electronic device to attain maximum conduction when said voltages are substantially equal, said varying voltage being supplied to said control electrode through said transforming means second portion, said voltage comparison circuit including a unidirectional conducting device connected between said varying voltage and said reference voltage whereby an increased positive bias is supplied to said control electrode when said voltages are substantially equal; a relay operatively connected in series between said transforming means first portion and a source of positive plate voltage, said relay having a contact connected intermediate said relay and said anode and connectable to ground upon actuation of said relay; and a condenser connected between said relay and ground.

4. In a signal level indicator circuit the combination comprising: an electronic device having at least an anode, a cathode, and a control electrode said cathode being connected to a source of negative voltage; voltage transforming means having a first portion connected to said anode and a second portion connected to said control electrode for positive feedback whereby an increase in anode current is reflected as an increase in signal on said control electrode; a voltage comparison circuit operationally connected to said electronic device, said voltage comparison circuit comprising means for supplying an unknown voltage to said control electrode through said transforming means second portion, means for comparing a reference voltage with said unknown voltage and maintaining a substantially fixed potential difference between said control electrode and said cathode when said voltages are not equal and causing said potential difference to increase in a positive direction when said voltages are substantially equal; a relay operatively connected in series between said transforming means first portion and a source of positive plate voltage, said relay having a contact connected intermediate said relay and said anode and connectable to ground upon actuation of said relay; and a condenser connecting said relay to ground.

5. In a signal level indicator circuit the combination comprising: an electronic device having at least an anode, a cathode, and a control electrode said cathode being connected to a source of negative voltage; voltage transforming means having a first portion connected to said anode and a second portion connected to said control electrode for positive feedback whereby an increase in anode current is reflected as an increase in signal on said control electrode; a voltage comparison circuit operationally connected to said electronic device, said voltage comparison circuit comprising means for supplying an unknown voltage to said control electrode through said transforming means second portion, means for comparing a reference voltage with said unknown voltage and maintaining a substantially fixed potential difference between said control electrode and said cathode when said voltages are not equal and causing said potential difference to increase in a positive direction when said voltages are substantially equal whereby said electronic device attains maximum conduction; a relay operatively connected in series between said transforming means first portion and a source of positive plate voltage, said relay having a contact connected intermediate said relay and said anode and connectable to ground upon actuation of said relay; and a condenser connecting said relay to ground.

6. In a signal level indicator circuit the combination comprising: an electronic device having at least an anode, a cathode, and a control electrode said cathode being connected to a source of negative voltage; voltage transforming means having a first portion connected to said anode and a second portion connected to said control electrode for positive feedback whereby an increase in anode current is reflected as an increase in signal on said control electrode; a voltage comparison circuit operationally connected to said electronic device, said voltage comparison circuit comprising means for supplying an unknown voltage to said control electrode through said transforming means second portion, means for comparing a reference voltage with said unknown voltage and maintaining a substantially fixed potential difference between said control electrode and said cathode when said voltages are not equal and causing said potential difference to increase in a positive direction when said voltages are substantially equal whereby said electronic device attains maximum conduction; a relay operatively connected in series between said transforming means first portion and a source of positive plate voltage, said relay having a contact connected intermediate said relay and said anode and connectable to ground upon actuation of said relay when said electronic device substantially attains maximum conduction; and a condenser connecting said relay to ground for providing an electrical path to ground through said relay when said electronic device begins substantial conduction.

7. In a signal level indicator circuit the combination comprising: an electronic device having at least an anode, a cathode, and a control electrode said cathode being connected to a source of negative voltage; voltage transforming means having a first portion connected to said anode and a second portion connected to said control electrode for positive feedback to said control electrode whereby an increase in anode current is reflected as an increase in signal on said control electrode; a voltage comparison circuit operationally connected to said electronic device, said voltage comparison circuit comprising means for supplying an unknown voltage to said control electrode through said transforming means second portion, means for supplying a reference voltage to said electronic device, and a non-linear device operatively connected between said unknown voltage and said reference voltage whereby the conduction of said electronic device will increase when the value of said unknown voltage substantially reaches the value of said reference voltage; a relay operatively connected in series between said transforming means first portion and a source of positive plate voltage, said relay having a contact connected intermediate said relay and said anode and connectable to ground upon actuation of said relay when said electronic device attains substantially maximum conduction; and a condenser connecting said relay to ground for providing an electrical path to ground through said relay when said electronic device begins substantial conduction.

8. In a signal level indicator circuit the combination comprising: an electronic device having at least an anode, a cathode, and a control electrode; voltage transforming means having a first portion connected to said anode and a second portion connected to said control electrode for positive feedback to said control electrode whereby an increase in anode current is reflected as an increase in signal on said control electrode; a voltage comparison circuit operationally connected to said electronic device, said voltage comparison circuit comprising means for supplying an unknown varying voltage to said control electrode through said transforming means second portion, means for supplying a fixed reference voltage to said control electrode, and a unidirectional conducting device connected between said unknown voltage and said reference voltage whereby a more positive potential will be applied to said control electrode when the magnitude of said unknown voltage substantially equals the magnitude of said reference voltage; biasing means connected to said cathode; a relay operatively connected in series with said transforming means first portion, said relay having a contact connected intermediate said relay and said anode and connectable to ground upon actuation of said relay when said electronic device attains substantially maximum conduction; a condenser connecting said relay to ground for providing an electrical path to ground through said relay when said electronic device begins substantial conduction; connection leads for supplying a positive potential to said anode; and connection leads for supplying a negative potential to said cathode.

9. In a signal level indicator circuit the combination comprising: an electronic device having at least an anode, a cathode, and a control electrode; voltage transforming means having a first portion connected to said anode and a second portion connected to said control electrode for positive feedback to said control electrode whereby an increase in anode current is reflected as an increase in signal on said control electrode; means for supplying an unknown varying voltage to said control electrode through said transforming means second portion; means for supplying a fixed reference voltage to said cathode; a unidirectional conducting device connected between said cathode and said reference voltage whereby said unidirectional device will begin conduction and a more positive bias will appear on said control electrode when the magnitude of said unknown voltage substantially reaches the magnitude of said reference voltage; a relay operatively connected in series with said transforming means first portion, said relay having a contact connected intermediate said relay and said anode and connectable to ground upon actuation of said relay when said electronic device attains substantially maximum conduction; a condenser connecting said relay to ground for providing an electrical path to ground through said relay when said electronic device begins substantial conduction; connection leads for supplying a positive potential to said anode; and connection leads for supplying a negative potential to said cathode.

References Cited in the file of this patent
UNITED STATES PATENTS

| | | |
|---|---|---|
| 2,649,557 | Ransom | Aug. 18, 1953 |
| 2,683,806 | Moody | July 13, 1954 |
| 2,714,842 | Hooven | Aug. 9, 1955 |
| 2,811,675 | McGee et al. | Oct. 29, 1957 |
| 2,824,297 | Josias | Feb. 18, 1958 |

OTHER REFERENCES

"Electronic Designers Handbook," McGraw-Hill Book Co., 1957, pages 10–7 to 10–14.